United States Patent Office 3,442,939
Patented May 6, 1969

3,442,939
NOVEL SULFONIC ACIDS AND PROCESS FOR SYNTHESIZING SULFONIC ACIDS
Ellis K. Fields, Chicago, Ill., assignor to Standard Oil Company, Chicago, Ill., a corporation of Indiana
No Drawing. Filed Apr. 13, 1966, Ser. No. 542,208
Int. Cl. C07c 143/24, 63/00; C11d 1/12
U.S. Cl. 260—511       6 Claims

ABSTRACT OF THE DISCLOSURE

A process for preparing novel sulfonic acids, which process comprises heating aromatic compounds which readily undergo electrophilic substitution, with 3-carboxy phenylsulfonyl chloride at a temperature of about 150 to 350° C. for a period of about 0.25 to 24 hours in the mole ratio of 4:1 to 20:1; also novel carboxylic acids are disclosed.

This invention relates to the preparation of novel aromatic sulfonic and carboxylic acids. More particularly, it relates to the preparation of aromatic sulfonic and carboxylic acids from aromatic compounds by heating these aromatic compounds at elevated temperatures with 3-carboxyphenylsulfonyl chloride, and their utilization as surface active agents and plasticizers.

The method of this invention comprises heating aromatic compounds with 3-carboxylphenylsulfonyl chloride at temperatures of about 150 to 350° C., preferably 220 to 300° C., for 0.25 to 24 hours, preferably 0.5 to 18 hours, in the mole ratio of 2:1 to 50:1, preferably 4:1 to 20:1, at pressures of 1–100 atmospheres. Aromatic compounds that readily undergo electrophilic substitution give sulfonic acids, easily isolated as their potassium salts. These include diphenyl, naphthalene, terphenyl, anthracene, phenanthrene, pyrene, chrysene, rubrene, and such aromatic rings containing 1–5 alkyl substituents, each with 1 to 40 carbon atoms, such as toluene, xylene, pseudocumene, durene, prehnitene, ethylbenzene, isoamylbenzene, dimethyl naphthalene, tri-isopropyl phenanthrene, n-dodecyl naphthalene, and the like. Aromatic compounds that do not readily undergo electrophilic substitution give carboxylic acids. These include acetophenone, benzophenone, p-dibromobenzene, trichlorobenzene, phenyl naphthyl ketone, anthraquinone, phenanthraquinone, diacetyl benzene, tetrafluoro naphthalene, benzoyl pyrene, naphthoyl chrysene, benzonitrile, terephthalonitrile, naphthonitrile, and the like.

The preparation of sulfonic acids when aromatic compounds, which readily undergo electrophilic substitution, are treated with 3-carboxyphenylsulfonyl chloride is a novel reaction. This type of reaction is wholly unexpected, since if the Friedel-Crafts type of reaction were to be predicted, the products should have been sulfones instead of ketones. The sulfonic acids are also not produced by a rapid intra- or inter-molecular reaction of the carboxyphenylsulfonyl chloride to give sulfobenzoyl chloride. It was found that when 3-carboxyphenylsulfonyl chloride was heated at 193° C.—that is 60° over its melting point—and then cooled, its melting point and mixed melting point were unchanged. Thus, according to the process of my invention, aromatic compounds that readily undergo electrophilic substitution give sulfonic acids when treated with 3-carboxyphenylsulfonyl chloride at elevated temperatures wherein the mole ratio of the 3-carboxyphenylsulfonyl chloride to the aromatic compound treated is greater than 1:1. The mechanism for the production of the sulfonic acids is apparently a thermal acylation.

The aromatic sulfonic acids are produced according to the following reaction:

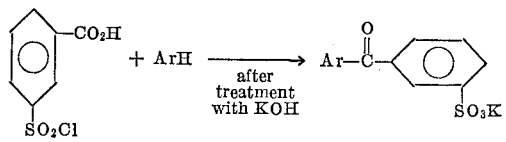

This is an unexpected reaction, since according to Friedel-Crafts the type of reaction should give the following products:

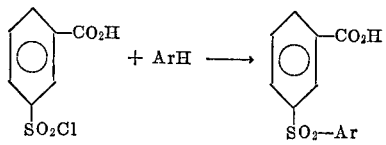

This confirms the novelty of my new synthetic method.

In accordance with my new method, the following new aromatic sulfonic acids were produced from diphenyl and naphthalene:

3-sulfophenyl diphenyl ketone having the formula:

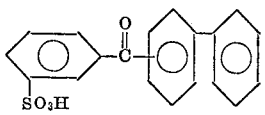

and 3-sulfophenyl naphthyl ketone having the formula:

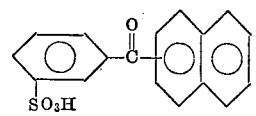

In addition, many other sulfonic acids can be produced utilizing this novel synthetic method. Illustrative of such sulfonic acids which can be produced are 3-sulfobenzoyl anthracene, 3-sulfobenzoyl phenanthrene, 3-sulfobenzoyl chrysene, 3-sulfobenzoyl rubrene, 3-sulfobenzoyl toluene, 3-sulfobenzoyl p-xylene, 3-sulfobenzoyl dodecyl benzene, 3-sulfobenzoyl durene, 3-sulfobenzoyl methyl naphthalene, and 3-sulfobenzoyl di-isopropyl naphthalene.

The aromatic compounds that do not readily undergo electrophilic substitution upon treatment with 3-carboxyphenylsulfonyl chloride at elevated temperatures give carboxylic acids in a free radical carboxy arylation. For example, benzophenone and p-dibromobenzene produced:

Phenyl carboxydiphenyl ketone having the formula:

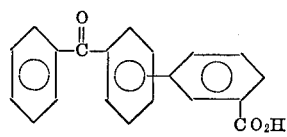

3-carboxy-2',5'-dibromodiphenyl having the formula:

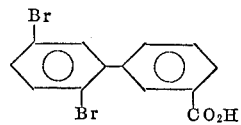

This method is useful for producing other carboxylic acids such as 3-carboxyphenyl acetophenone, 3-carboxyphenyl dinaphthyl ketone, 3-carboxyphenyl anthraquinone, 3-carboxyphenyl phenanthraquinone, diacetyl 3-carboxydiphenyl, carboxy cyano biphenyl, carboxy dicyano biphenyl, and 3-carboxyphenyl naphthonitrile.

The products from the novel process of my invention are useful as surface active agents and plasticizers.

The following illustrative examples will provide a clearer understanding of the nature and scope of the present invention.

EXAMPLE I 3-carboxyphenylsulfonyl chloride was prepared by heating 360 ml. (5.5 moles) chlorosulfonic acid and 127 g. (1.04 moles) benzoic acid at 125° C. for 1 hour, then pouring on crushed ice. The white solid was collected on a filter, washed with cold water, and dissolved in 300 ml. of benzene plus 50 ml. of heptane at 70° C. The solution was decanted from the water layer, treated with 100 ml. of heptane, and cooled to 10° C. The crystals were collected on a filter and sucked dry, giving 177.1 g. of 3-carboxyphenylsulfonyl chloride melting at 132–133° C. The yield was 77 percent.

A mixture of 4.41 g. (0.02 mole) 3-carboxyphenylsulfonyl chloride and 46.2 g. (0.3 mole) diphenyl was refluxed for 5¼ hours, during which time hydrogen chloride evolved. The mixture was cooled to 85° C., then refluxed for 1 hour with 200 ml. of benzene and 50 ml. of 10 percent aqueous potassium hydroxide. The hot aqueous solution was cooled to 15° C. and the white crystals which deposited were recrystallized from water, giving 2.7 g. (36 percent) of the potassium salt of 3-sulfophenyl diphenyl ketone melting at 324–333° C.

Analysis for $C_{19}H_{13}SO_4K$, calculated: C, 60.6; H, 3.5; S, 8.5; K, 10.4. Found: C, 60.4; H, 3.7; S, 8.2; K, 10.8.

EXAMPLE II

A mixture of 6.62 g. (0.03 mole) 3-carboxyphenylsulfonyl chloride and 57.7 g. (0.45 mole) naphthalene was refluxed for 26 hours, then worked up as in Example I, giving 2.9 g. (29 percent) of white, crystalline potassium salt of 3-sulfophenyl naphthyl ketone, melting at 276–283° C.

Analysis for $C_{17}H_{11}SO_4K$, calculated: C, 58.2; H, 3.1; S, 9.1; K, 11.1. Found: C, 58.2; H, 3.2; S, 8.9; K, 10.9.

EXAMPLE III

For comparison, the acid chloride of 3-carboxyphenylsulfonyl chloride was prepared by warming a mixture of 22 g. (0.1 mole) of 3-carboxyphenylsulfonyl chloride and 20.8 g. (0.1 mole) of phosphorus pentachloride at 60° C. till evolution of hydrogen chloride stopped, then stripping off the phosphorus oxychloride in vacuo. The residue was used with no further purification.

A mixture of 4.7 g. (0.02 mole) 3-chlorocarbonylphenylsulfonyl chloride and 46.2 g. (0.3 mole) diphenyl was refluxed for 4.75 hours, then worked up as in Example I, giving 4.55 g. (60 percent) of potassium salt of 3-sulfophenyl diphenyl ketone, melting at 339–342° C.

Analysis for $C_{19}H_{13}SO_4K$, calculated: C, 60.6; H, 3.5; S, 8.5; K, 10.4. Found: C, 61.0; H, 3.6; S, 8.4; K, 10.0.

Its infrared spectrum (Nujol mull) was indistinguishable from that of the product of Example I.

EXAMPLE IV

From a mixture of 4.78 g. (0.02 mole) 3-chlorocarbonylphenylsulfonyl chloride and 38.5 g. (0.3 mole) naphthalene, refluxed 18 hours, was obtained 4 g. (57 percent) of potassium salt of 3-sulfophenyl naphthyl ketone, malting at 285–292° C.

Analysis for $C_{17}H_{11}SO_4K$, calculated: C, 58.2; H, 3.1; S, 9.1; K, 11.1. Found: C, 58.0; H, 3.4; S, 8.8; K, 11.4.

Its infrared spectrum (Nujol mull) was indistinguishable from that of the product of Example II.

EXAMPLE V

A mixture of 6.61 g. (0.03 mole) of 3-carboxyphenylsulfonyl chloride and 72 g. (0.4 mole) benzophenone was refluxed for 1 hour. The product was refluxed with 100 ml. of 5% aqueous potassium hydroxide and 100 ml. of benzene for 0.5 hour. The aqueous layer was cooled, giving no solid; on acidification, crystals precipitated 7.1 g. (78 percent). A portion was purified by filtering its ethanol solution through charcoal, concentrating, treating the hot solution with water till cloudy, and chilling. The crystals, phenyl carboxydiphenyl ketone, melted at 188–192° C.

Analysis for $C_{20}H_{14}O_3$, calculated: C, 79.4; H, 4.6; neutral equivalent, 302. Found: C, 79.1; H, 4.8; neutral equivalent, 297.

The acid was converted to its methyl ester through the acid chloride; the viscous ester boiled at 220° C. at 3 mm. Its mass spectrum showed that the molecular weight was 316; theoretical molecular weight, 316.

EXAMPLE VI

A mixture of 4.42 g. (0.02 mole) 3-carboxyphenylsulfonyl chloride and 70.8 g. (0.3 mole) of p-dibromobenzene was refluxed for 168 hours. One hundred ml. of benzene and 50 ml. of 10 percent aqueous potassium hydroxide were added, the mixture refluxed 0.5 hour, and the aqueous solution was separated and acidified, giving 1.4 g. (19 percent) of precipitate.

The identical reaction was run with the addition of 0.2 g. cuprous chloride. The same workup gave 1.5 g. (20 percent) of precipitate, that was easier to crystallize than that above, from heptane. The crystals, 3-carboxy-2',5'-dibromodiphenyl, melted at 213–214° C.

Analysis for $C_{13}H_{18}O_2Br_2$, calculated: C, 43.3; H, 2.3; Br, 44.9; acid number, 151. Found: C, 43.2; H, 2.5; Br, 44.6; acid number, 152.

The prolonged reaction time and relatively low yield was because of the low boiling point of p-dibromobenzene. Best results are obtained at 240° C. or above. Pressure vessels may be used, especially if provided with a means of venting the sulfur dioxide and hydrogen chloride formed in the reactions.

I claim:
1. A process for synthesizing aromatic sulfonic acids, which process comprises heating aromatic compounds selected from the group consisting of diphenyl, naphthalene, terphenyl, anthracene, phenanthrene, pyrene, chrysene, rubrene, toluene, xylene, pseudocumene, durene, prehnitene, ethylbenzene, isoamylbenzene, dimethyl naphthalene, tri-isopropyl phenanthrene and n-dodecyl naphthalene, with 3-carboxyphenylsulfonyl chloride at a temperature of about 150 to 350° C. for a period of about 0.25 to 24 hours in the mole ratio of 4:1 to 20:1.

2. A member of the group consisting of:
(A) compounds having the formula

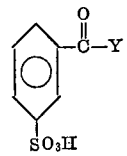

wherein Y is

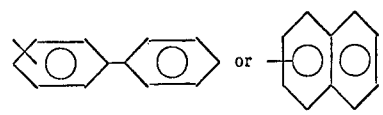

(B) the alkali or alkaline earth metal salts of said compounds.

3. The compound of claim 2 wherein Y is:

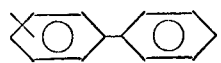

4. The compound of claim 2 wherein Y is:

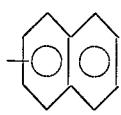

5. A process for synthesizing 3-sulfophenyl diphenyl ketone of the formula:

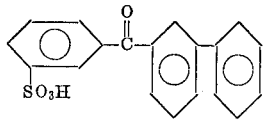

which process comprises heating diphenyl with 3-carboxyphenylsulfonyl chloride at a temperature of about 150–350° C. for a period of about 0.25 to 24 hours, in the mole ratio of 4:1 to 20:1.

6. A process for synthesizing 3-sulfophenyl naphthyl ketone of the formula

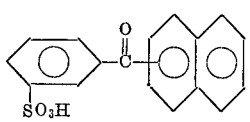

which process comprises heating naphthalene with 3-carboxyphenylsulfonyl chloride at a temperature of about 150–350° C. for a period of about 0.25 to 24 hours, in the mole ratio of 4:1 to 20:1.

References Cited

UNITED STATES PATENTS 3,316,295   4/1967   Starnes.

OTHER REFERENCES

Fields, Chemical Abstracts 64, 633d (1965).
Snyder et al., J. Am. Chem. Soc. 71, 289–291 (1947).
Gilman et al., J. Am. Chem. Soc. 78, 2217–2222 (1956).
Shriner et al., J. Am. Chem. Soc. 79, 227–230 (1957).

DANIEL D. HORWITZ, *Primary Examiner.*

U.S. Cl. X.R.

252—161; 260—396, 465, 515, 517